United States Patent [19]
Hubbard

[11] Patent Number: 5,648,918
[45] Date of Patent: Jul. 15, 1997

[54] CALIBRATION OF A PLURALITY OF EXCITATION SOURCES FOR AN INSTRUMENTATION SYSTEM

[75] Inventor: Evan A. Hubbard, Austin, Tex.

[73] Assignee: National Instruments Corporation, Austin, Tex.

[21] Appl. No.: 458,974

[22] Filed: Jun. 2, 1995

[51] Int. Cl.$^6$ .................................................. G01C 25/00
[52] U.S. Cl. ........................ 364/571.01; 364/483; 307/43
[58] Field of Search .................................. 364/483, 492, 364/571.01; 363/148; 324/73.1, 74; 327/257, 258–260; 307/15, 16, 18, 43–80

[56] References Cited

U.S. PATENT DOCUMENTS

| | | | |
|---|---|---|---|
| 4,322,790 | 3/1982 | Wolfinger | 363/148 |
| 4,532,434 | 7/1985 | Layton | 307/261 |
| 4,646,299 | 2/1987 | Schinabech et al. | 324/73 R |

OTHER PUBLICATIONS

*The Art of Electronics*, Second Edition, Paul Horowitz, Harvard University, Winfield Hill, Rowland Institute for Science, Cambridge University Press, 1989, p. 252.

*Intuitive Operational Amplifiers From Basics to Useful Applications*, Revised Edition, Thomas M. Frederiksen, McGraw–Hill Book Company, 1988, pp. 206–208.

*Primary Examiner*—James P. Trammell
*Attorney, Agent, or Firm*—Conley, Rose & Tayor; Jeffrey C. Hood

[57] ABSTRACT

A calibration system for calibrating a plurality of excitation sources of an instrumentation system. The calibration system allows a single calibration adjustment for calibrating all of the excitation sources simultaneously rather than having to independently adjust each excitation source. An adjustable Zener diode coupled to a potentiometer forms an adjustable calibration circuit providing a reference voltage to a plurality of current excitation sources. Each current source preferably includes a buffer and transistor control circuit receiving the reference voltage for controlling current through a precision resistor. In this manner, only the precision resistor is duplicated for each channel, where the calibration adjust mechanism is provided in a single circuit for all channels. This significantly reduces circuitry and cost while also simplifying the calibration procedure to a single adjustment.

19 Claims, 3 Drawing Sheets

5,648,918

CALIBRATION OF A PLURALITY OF EXCITATION SOURCES FOR AN INSTRUMENTATION SYSTEM

FIELD OF THE INVENTION

The present invention relates to instrumentation systems, and more particularly to calibration of excitation sources of an instrumentation system.

DESCRIPTION OF THE RELATED ART

Scientists and engineers often use instrumentation systems for data measurement and acquisition to perform a variety of functions, including laboratory research, process monitoring and control data logging, analytical chemistry tests and analysis of physical phenomena and control of electrical machinery to name a few examples. Generally a process being monitored or otherwise controlled, referred to as the unit under test (UUT), is interfaced to one or more I/O (input/output) devices. The I/O interface options include instrumentation associated with the GPIB (general purpose interface bus), the VXI bus, the RS232 protocol, SCXI (signal conditioning extensions for instrumentation) and corresponding SCXI bus, as well as other acquisition and conditioning systems as known to those skilled in the art.

SCXI is a high performance signal conditioning and instrumentation system for PC-based data acquisition and control. The PC or processor system generally comprises a computer, such as an IBM compatible computer, a Macintosh or similar type PC system, which includes an I/O bus and corresponding connectors or slots for receiving I/O boards. A data acquisition (DAQ) board is plugged into the I/O slot of the computer system for communicating with signal conditioning modules plugged into a SCXI chassis for ultimately interfacing the UUT with the processing system. Alternatively, an SCXI DAQ module with a parallel port interface serves to acquire signals and transmit digital data to the parallel port of the PC. The PC may further include analysis hardware and software for analyzing and appropriately displaying the measured data. The signal conditioning modules interface with the I/O signals of and transducers connected to the UUT to perform signal conditioning functions, such as amplification, multiplexing, isolation, filtering, sample and hold, transducer excitation and relay control, among other conditioning functions.

One particular function of an instrumentation system is to assert one or more excitation signals to a measurement circuit and measure the corresponding responses from the measurement circuit. The measurement circuit typically includes a measuring device for measuring one of several parameters of the UUT apparatus, such as thermocouples, RTDs, strain gauges, thermistors, etc. The signal conditioning module asserts an excitation signal, such as a voltage or current source and measures corresponding responses through the various inputs described above. In this manner, the system applies a known excitation source voltage or current and measures the corresponding response signal for measuring the desired parameter, such as temperature, pressure, etc. The measured signals are further amplified, multiplexed, isolated, filtered, or otherwise converted to the appropriate form for transmission to the PC for analysis or display.

To achieve the desired accuracy in the measured data, it is necessary to first calibrate the instrumentation system. This is particularly true for the excitation signals asserted by the instrumentation system to measurement circuits. The more precise the excitation signals are, the more accurate the measurement is. Certain environmental conditions, such as pressure or temperature, can affect the measurement so that a variable input, such as a potentiometer or the like, is provided to adjust each excitation channel output prior to measurement. For each channel, an accurate measuring device, such as a precision ammeter, is connected to the output and the excitation is adjusted until the excitation signal is within the desired range of accuracy for the measurement. Although such calibration is not very difficult for any particular channel, it is often necessary to calibrate a plurality of channels in order to take a plurality of simultaneous measurements. For example, it may be desired to measure the temperature at a plurality of locations within the UUT simultaneously. Thus, each of the channels must be calibrated as precisely as possible. This is particularly difficult if each of the measurements is related so that it is desired that all of the channel outputs track each other as closely as possible.

Calibration of multiple channels is time-consuming and tedious since each of the channels must be calibrated separately or individually. Also, calibration circuitry is needed for each channel to achieve the desired calibration range, resulting in a rather complicated and expensive system. To implement the desired variable calibration for each channel, a reference signal is applied to precision resistor in series with a relatively small variable resistor for providing an accurate reference signal to excitation source circuitry. For example, each channel requires a voltage reference, a precision resistor and a variable resistor to provide an appropriate reference signal to a current source circuit for providing an accurate current excitation source. This results in a relatively costly instrumentation system, since each channel requires a separate voltage reference and precision resistor, as well as a separate variable resistor for calibration purposes.

It is desired to provide improved calibration for a plurality of excitation sources of an instrumentation system. It is further desired to provide such improvements with an increase in efficiency and reduced cost.

SUMMARY OF THE INVENTION

A calibration system for calibrating a plurality of excitation sources for an instrumentation system according to the present invention includes a single adjustable reference source with a single variable input for providing an adjustable reference signal to all of the excitation sources. In this manner, calibration is performed once for a plurality of excitation channels, thereby simplifying the entire calibration procedure. Furthermore, a single reference source and variable input substantially reduces cost since it is not necessary to include separate reference sources for each of the channels.

In the preferred embodiment, the adjustable reference source is a variable voltage device including a variable resistor or potentiometer for adjusting a reference voltage. The variable voltage device includes a Zener diode having an adjustable input connected to a potentiometer, where the potentiometer is adjusted for controlling the adjustable input and thus the reference voltage across the Zener diode. The reference voltage is applied to a plurality of current source circuits, each providing a current excitation signal on one or more corresponding channels of the instrumentation system.

Each of the current sources preferably includes an amplifier and transistor circuit for controlling the current through a precision resistor. In particular, the amplifier is coupled as a voltage follower applying the reference voltage across the precision resistor, where the amplifier further controls the transistor for developing a calibrated current through the precision resistor. Since the voltage reference signal is adjusted only once, all of the current excitation source outputs are simultaneously calibrated.

It is thus appreciated that the present invention substantially improves calibration of a plurality of excitation source channels by using a single calibration adjust circuit for all channels for simultaneous calibration. The use of a single calibration circuit improves efficiency and reduces cost of the instrumentation system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
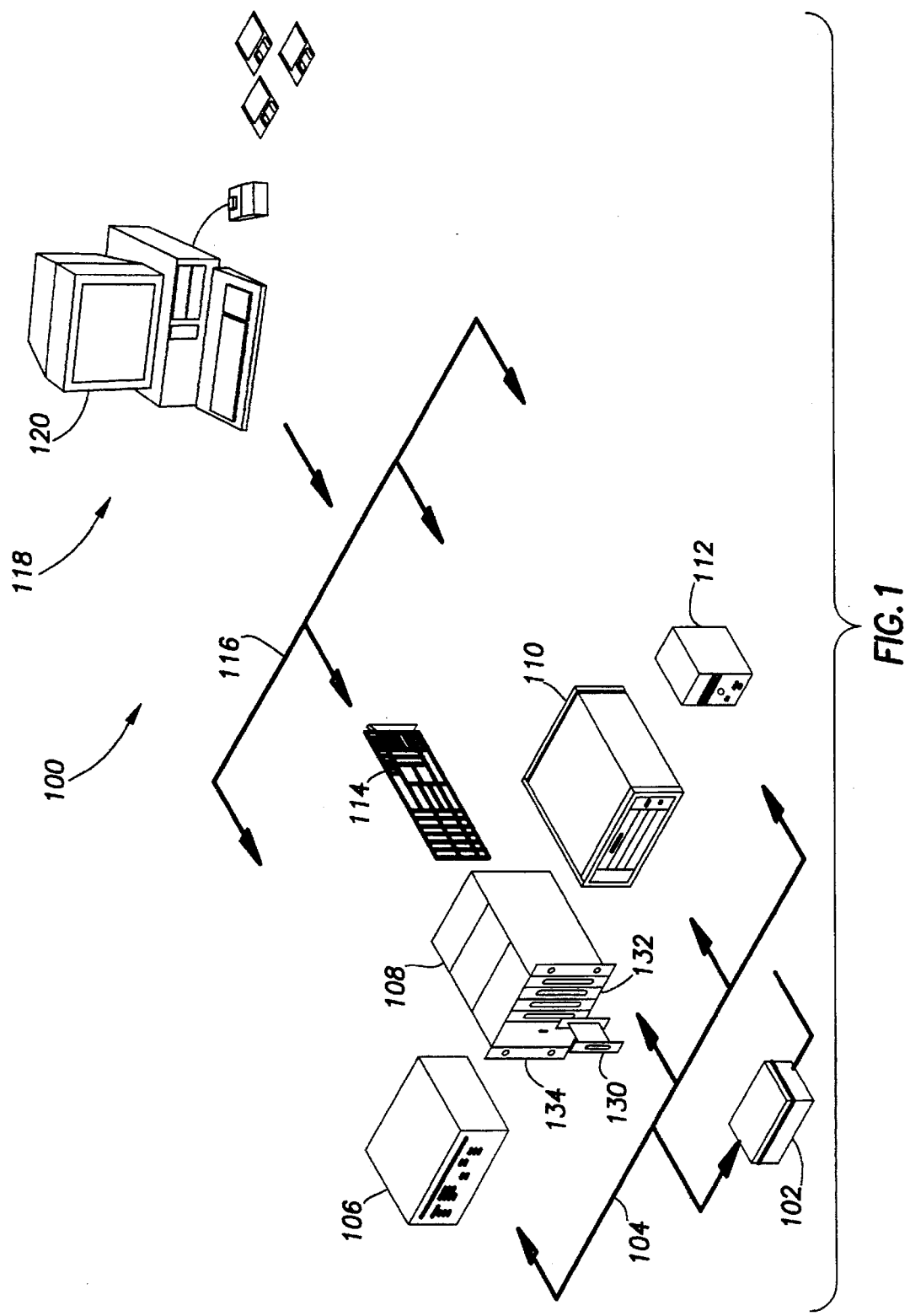
FIG. 1 is a perspective view of an instrumentation system according to the present invention.

Referring now to FIG. 1, a perspective diagram of an instrumentation system 100 is shown. A unit under test (UUT) 102 generally represents a process or other physical phenomena being monitored or controlled, including transducers or other sensing devices for detecting or measuring temperature, pressure, voltage, strain, etc. The UUT 102 is shown coupled to one or more interface devices, such as a GPIB instrument 106, an SCXI instrument 108, a VXI instrument 110 or an RS232 instrument 112 through an interface bus 104. The various instrument devices 106, 108, 110, 112 generally isolate field signals provided from the UUT 102 and otherwise amplify, reduce, or filter the field signals to provide corresponding digitals either directly to a computer system 118 or through a plug-in DAQ board 114 plugged into an I/O slot of the computer system 118. Preferably, the DAQ board 114 is coupled to the I/O bus 116 of the computer system 118. A typical instrumentation system might only include one of the instruments 106, 108, 110 or 112. The present invention primarily concerns the SCXI instrument 108.

The SCXI instrument 108 is a high performance signal conditioning and instrumentation system for PC-based data acquisition and control. The I/O signals and transducer connections from the UUT 102 are connected to one or more terminal blocks 130, which are shielded housings for direct connection of signal wires and strain relief clamps for maximum connection reliability. Each terminal block 130 connects directly to the front of one of a plurality of signal conditioning modules 132, which are further plugged into corresponding slots of an SCXI chassis 134. In general, each of the signal conditioning modules 132 are designed for performing one or more of several signal conditioning functions, such as amplification, multiplexing, isolation, filtering, sampling, transducer excitation, relay control, etc.

The SCXI instrument 108 may be used as a front end signal conditioning system for the plug-in DAQ board 114, which includes a plurality of channels and appropriate circuitry for collecting data and providing the collected data to the I/O bus 116 of the computer system 118. In an alternative embodiment, an SCXI data acquisition and control module is plugged into the SCXI chassis 134 for transmitting data directly to the computer system 118 through its parallel port.

As will be described more fully below, one function of one or more of the instruments 106–112, including the SCXI instrument 108, is to assert a plurality of excitation signals to measurement circuits and transducers within the UUT 102 and for measuring response signals corresponding to measured parameters, such as temperature, pressure, strain, etc. In FIG. 1, for example, stimulus control signals are applied to the UUT 102 across the bus 104 and corresponding parameter (temperature, pressure, etc.) signals are monitored by the SCXI instrument 108.

Figure 2A:
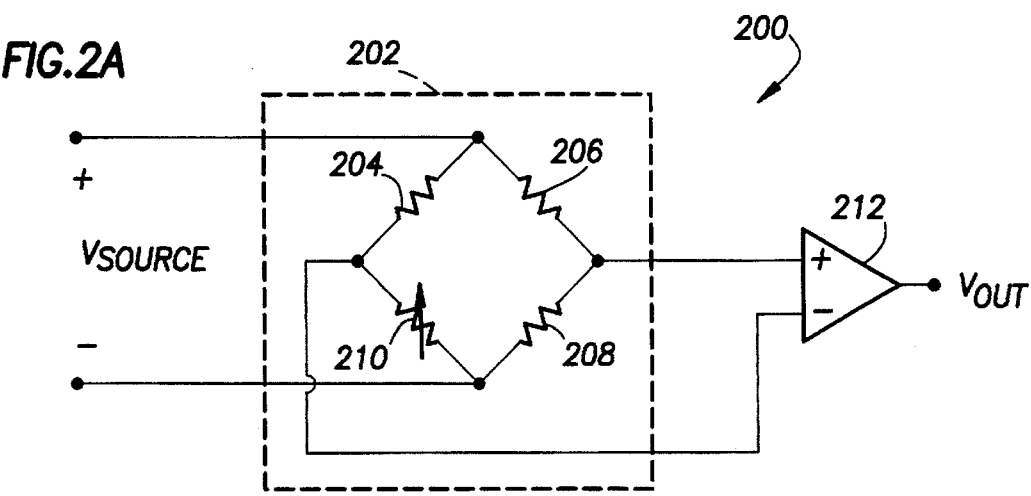
FIG. 2A is a simplified diagram of a strain gauge measurement circuit.

Referring now to FIG. 2A, a simplified schematic diagram is shown of a strain gauge measurement circuit 200 which could be used in the instrumentation system 100. Generally, a source voltage referred to as $V_{source}$, is applied to the input terminals of a bridge circuit 202, which includes four resistive branches coupled in bridge configuration as known to those skilled in the art. For example, three resistors 204, 206, and 208 have known resistances, comprise three of the branches, and are usually precision resistors to obtain the desired accuracy. The fourth branch is preferably a strain transducer 210 having a resistance proportional to the amount it is deformed when subjected to a strain force, such as bending, stretching, or a compression force. Thus, the strain gauge measurement circuit 210 itself is typically mounted within the UUT 102. A high impedance amplifier 212 is coupled to the output terminals of the bridge 202 for asserting an output voltage $V_{out}$ indicative of the resistance of the strain transducer 210. In this manner, a known voltage source, $V_{source}$, is applied and the $V_{out}$ signal is measured, and a processing system, such as the computer system 118, determines the corresponding resistance of the strain transducer 210 and thus calculates the amount of strain.

Figure 2B:
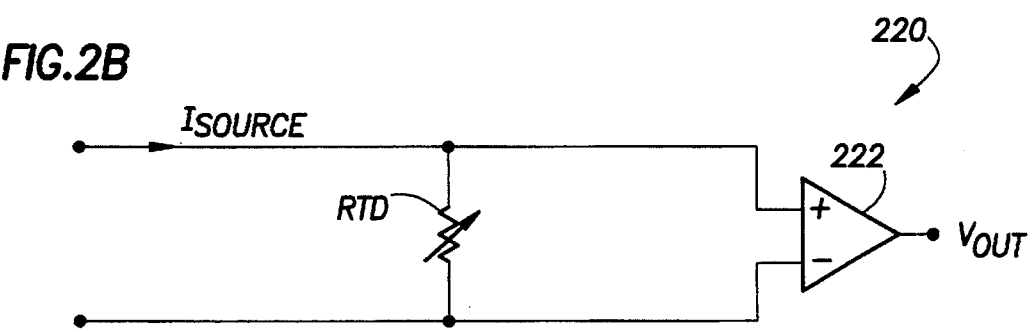
FIG. 2B is a simplified diagram of a temperature measurement circuit.

FIG. 2B illustrates a temperature measurement circuit 220 for measuring the ambient temperature at a certain location within the UUT 102 using an RTD resistor. In particular, a known current, referred to as $I_{source}$, is applied through the RTD resistor and a high impedance amplifier 222 has its input coupled across the RTD resistor in an output for asserting an output signal $V_{out}$. It is noted that the RTD resistor may alternatively be replaced by any one of several types of transducers for measuring any one of a variety of parameters.

The strain gauge measurement circuit 200 and the temperature measurement circuit 220 described above require excitation source signals from the instrumentation system 100 in order to develop the measured signal. The measured output signal is directly related to variances of the transducer or measuring device, as well as variances in the excitation source. Therefore, the accuracy of the measurement is directly dependent upon the accuracy of the excitation source, such as the $V_{source}$ and $I_{source}$ signals shown in FIGS. 2A, 2B. Therefore, in order to achieve accurate measurements, the instrumentation system must be calibrated so that the excitation signals are as accurate as possible.

Figure 3:
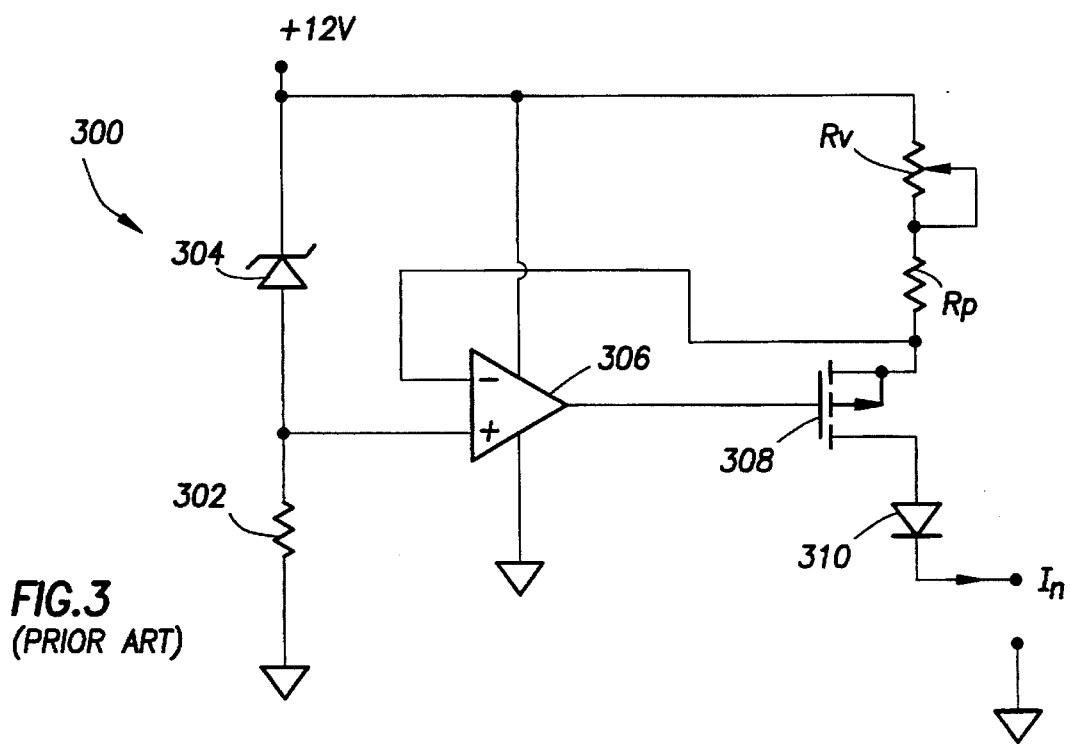
FIG. 3 is a diagram illustrating an excitation system according to prior art.

Referring now to FIG. 3, a simplified block diagram is shown of an excitation system 300 according to prior art. A resistor 302 has one end coupled to ground and its other end coupled to the non-inverting input of an amplifier 306 and the anode of a Zener diode 304. The cathode of the Zener diode 304 is connected to a twelve volt voltage source signal, referred to as +12 V, which provides power to the amplifier 306 and is connected to one end of a variable resistor $R_V$. The other end of the variable resistor $R_V$ is connected to one end of a resistor $R_p$, having its other end connected to the drain of a p-channel metal oxide semiconductor field-effect transistor (MOSFET) 308 and to the inverting input of the amplifier 306. The source of the MOSFET 308 is connected to the anode of a diode 310. The cathode of the diode 310 provides a current excitation signal $I_n$, which is one of a plurality of similar excitation signals from similar excitation systems.

In operation, the Zener diode 306 preferably develops a reference voltage of 2.5 volts, where the amplifier 306 controls the MOSFET 308 to maintain this reference voltage across both resistors $R_V$ and $R_p$. The excitation system 300 is calibrated by adjusting the variable resistor $R_V$. In particular, an ammeter is connected to measure $I_n$ and $R_V$ is adjusted until the desired current is achieved.

It is noted that it is often desired or otherwise required to develop a plurality of source signals for taking a plurality of measurements. Often, these measurements are related. In particular, a plurality of excitation current sources may be applied to a plurality of RTD resistors for taking a simultaneous plurality of temperature measurements at a plurality of locations within the UUT 102. For example, it may be desired to measure the temperature across a given space or through a given volume over time, where several measurements are taken upon consecutive time intervals. To achieve accurate results, it is not only desired to calibrate each of the source signals as accurately as possible, it is also desired that the source signals track each other over time, or are at least accurate within a certain specified independent parameter and further have as low a variance as possible. It is noted that it is often desired to take a plurality of independent measurements requiring a plurality of calibrated excitation sources.

It is easily seen that in order to calibrate a plurality of excitation systems such as the excitation system 300 for a plurality of channels, each of the channels must be calibrated individually by connecting a measuring device, such as an meter, to the output and adjusting the viable resistor $R_V$ for each channel until the desired accuracy is achieved. This must be repeated for each of the n channels, which generally consumes valuable time in the field to assure accurate measurements. Furthermore, the resulting instrumentation system is more expensive since a plurality of separate adjust circuits and variable resistors for developing the appropriate reference voltages must be provided for each individual channel. Also, since channels do not track each other over temperature and time, in order to achieve tracking similar to the present invention, more precise components must be used, resulting in an even more expensive instrumentation system. This results in a relatively expensive instrumentation system requiring significant maintenance and substantial time to calibrate. The present intention allows simultaneous calibration of all channels and eliminates all of these other limitations.

Figure 4:
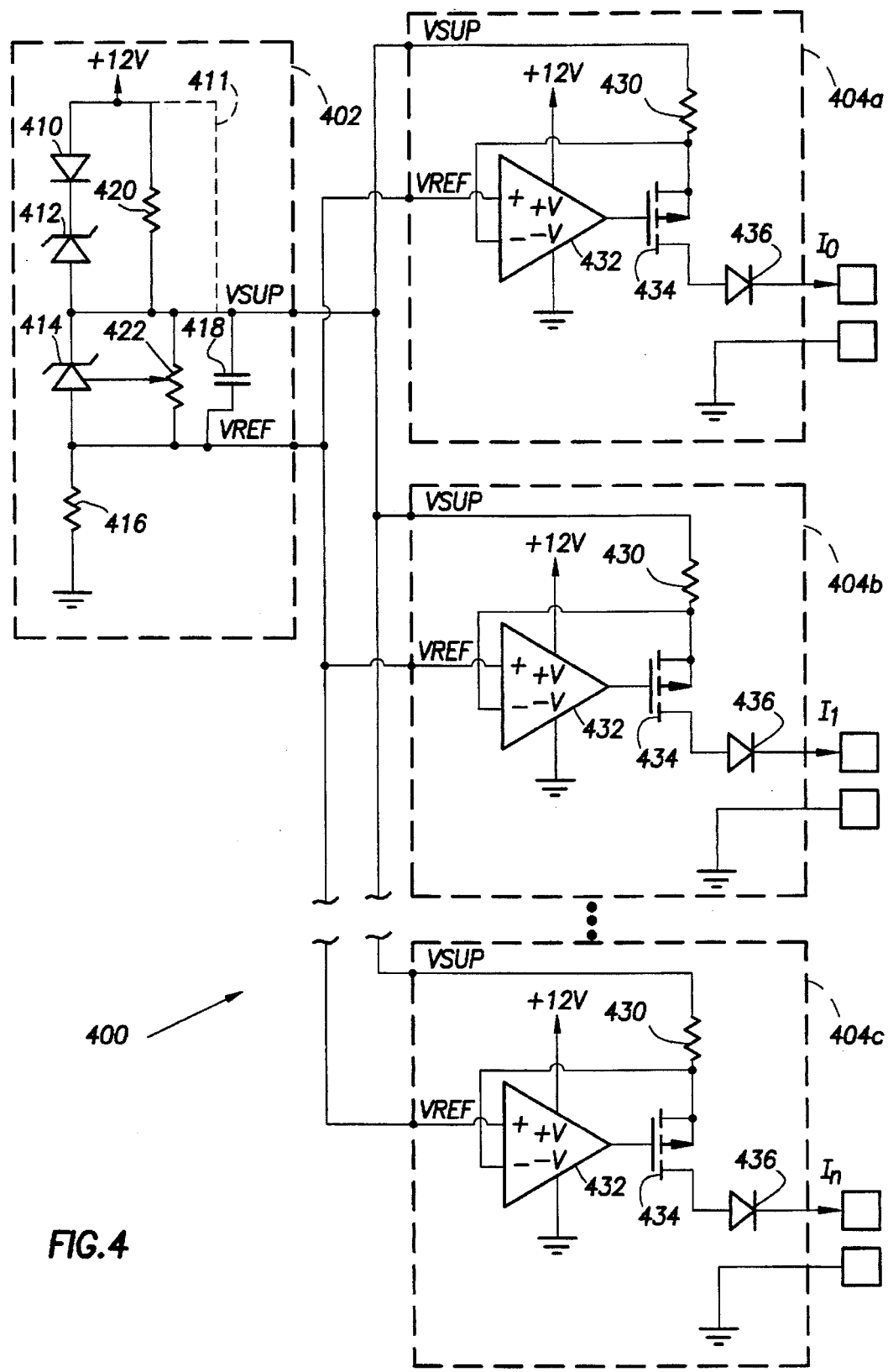
FIG. 4 is a calibration system for calibrating a plurality of excitation sources for an excitation system according to the present invention.

Referring now to FIG. 4, an excitation system 400 including a calibration circuit 402 according to the present invention is shown. The calibration circuit 402 provides two voltage signals VSUP and VREF, which effectively define a reference voltage potential, which is further provided to a plurality of current sources 404a, 404b, and 404c, as shown. The current sources 404a, 404b, 404c develop excitation current signals $I_0, I_1, \ldots I_n$, respectively, and each are substantially identical to each other. It is understood that although only three current sources 404a, 404b, 404c are shown, more are connected to the calibration circuit 402 between 404b and 404c as desired to achieve as many channels as desired.

A voltage source signal, referred to as +12 V preferably having a voltage of 12 V, is provided to the anode of a diode 410, having its cathode connected to the anode of a Zener diode 412. The cathode of Zener diode 412 is further connected to the anode of a Zener diode 414, which is preferably the LT1009S8 by Linear Technologies, although other suitable variable Zener diodes are contemplated. The cathode of Zener diode 414 is connected to one end of a resistor 416 having its other end connected to ground. A filter capacitor 418 is connected between the VSUP and VREF signals. The +12 V signal is further provided to one end of an optional and alternative resistor 420, having its other end connected to the cathode of the Zener diode 414 and to one end of a potentiometer 422. The other end of the potentiometer 422 is connected to the anode of the Zener diode 414 and the adjust terminal of the potentiometer 422 is connected to the adjust input of the Zener diode 414. The signals developed across the anode and cathode of the Zener diode 414 are the VREF and VSUP signals, respectively.

Within the current source 404a, the VSUP signal is provided to one end of a resistor 430, having its other end connected to the inverting input of an amplifier 432 and to the drain of a p-channel MOSFET 434. The amplifier 432 is either the LF 347 or the AD706 operational amplifier. The LF 347 is a relatively inexpensive component and performs sufficiently well for the current sources except that the diodes 410, 412 or the resistor 420 are required to limit its maximum input voltage range. The AD706 allows a wider input voltage range where the diodes 410, 412 or the resistor 420 would not be necessary. The VREF signal is provided to the non-inverting input of the amplifier 432, which receives source voltage from the +12 V signal and ground. The output of the amplifier 432 is provided to the gate of the MOSFET 434, having its source connected to the anode of a diode 436. The cathode of the diode 436 provides the $I_o$ signal. The remaining current sources 404b, 404c, etc. are similar to that of the current source 404a and will not be further described.

Operation of the excitation system 400 is now described. It is noted that either the diodes 410, 412 or the resistor 420 are used in alternative embodiments, but not both. The voltage across the diode 410 is approximately 0.5 V and the Zener diode 412 develops a voltage of about 1.2 V to step the voltage of the +12 V signal down to approximately 10 V. These diodes are generally used to decrease the voltage of the +12 V signal to a useable voltage of the amplifiers 432 if needed to decrease the input voltage range. The resistor 420 is used in the alternative and performs a similar function, although its voltage varies with its current. In the preferred embodiment, the amplifier 432 is able to handle increased input voltage range so that the diodes 410, 412 or the resistor 420 are not necessary. In this case, the +12 V signal is connected directly to the VSUP signal as indicated by a connecting conductor 411, which replaces diodes 410, 412 and resistor 420. The Zener diode 414 further develops a nominal voltage of 2.5 V which may be adjusted by +/−125 mV using the potentiometer 422. In this manner, the voltage between the VSUP and VREF signals is varied by the potentiometer 422 between a low value of approximately 2.375 V to a high value of approximately 2.635 V.

Each of the amplifiers 432 generally attempt to maintain its inverting and non-inverting inputs at the same voltage level so that the inverting input is maintained approximately equal to the voltage of the VREF signal. In this manner, the amplifier 432 controls the MOSFET 434 in such a manner to maintain the voltage between the VSUP and VREF signals across the resistor 430. In this manner, the voltage appearing across the Zener diode 414 as adjusted by the potentiometer 422 is applied across all of the resistors 430 to develop calibrated excitation current through the resistors 430. The excitation current flows through the drainage and source terminals of the MOSFET 434 and through the diode 436 to develop the $I_0$ current signal. In the preferred embodiment, the resistor 430 is a precision resistor having a resistance of 2.49K with a variance of 0.5%, so that the nominal current is 1 mA for each of the current sources 404a, 404b, 404c, etc. Further, a single chip or resistor pack includes a plurality of laser trimmed resistors to implement the resistors 430. Due to circuit variances, however, this current may be slightly different so that it may be adjusted through the potentiometer 422.

Calibration of the excitation source circuit 400 is performed only once for all of the channels and thus achieves simultaneous calibration of all channels connected to the calibration circuit 402. In particular, a measurement device, such as an ammeter, is connected to one of the output signals, such as the $I_0$ signal, and the potentiometer 422 is adjusted until the $I_0$ signal is precisely at the desired current level. Once this is performed, all of the current sources 404a, 404b, 404c, etc. are calibrated and ready for measurement. No further calibration is necessary.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. An excitation system for an instrumentation system for providing a plurality of excitation signals, comprising:
   an adjustable reference source having a variable input for providing an adjustable reference signal within a predetermined range, wherein said adjustable reference signal comprises a DC electrical signal; and
   a plurality of excitation sources, each having an input for receiving said adjustable reference signal and an output for providing a calibrated excitation signal corresponding to said adjustable reference signal.

2. The excitation system of claim 1, wherein said adjustable reference source comprises an adjustable voltage source, wherein said adjustable reference signal comprises a reference voltage signal.

3. The excitation system of claim 2, wherein said adjustable voltage source comprises:
   a primary voltage source;
   an adjustable voltage device coupled to said voltage source having a predetermined nominal voltage and an adjust input; and
   a variable resistor coupled to said adjust input of said adjustable voltage device for varying said reference voltage signal about said nominal voltage and within said predetermined range.

4. The excitation system of claim 3, further comprising:
   a voltage drop device coupled between said primary voltage source and said adjustable voltage device.

5. The excitation system of claim 4, wherein said voltage drop device comprises a resistor.

6. The excitation system of claim 1, wherein each of said plurality of excitation sources comprises a current source for providing a calibrated current signal.

7. The excitation system of claim 6, wherein each of said plurality of current sources comprises:
   a precision resistor receiving one polarity of said reference voltage signal; and
   an amplifier circuit coupled to said precision resistor and receiving the other polarity of said reference voltage signal, said amplifier circuit having an output for providing said calibrated current signal corresponding to said reference voltage signal applied across said precision resistor.

8. The excitation system of claim 7, wherein each said precision resistor is part of the same precision resistor pack chip for all of said current sources.

9. A calibration system for calibrating a plurality of excitation sources of an instrumentation system, comprising:
   a primary voltage source;
   an adjustable voltage reference coupled to said primary voltage source including an adjust input for providing an adjustable voltage signal for calibrating the plurality of excitation sources; and
   a voltage divider coupled to said primary voltage source and said voltage reference, said voltage divider including:
      a potentiometer having a resistive path coupled across said adjustable voltage reference and an adjust output coupled to said adjust input of said adjustable voltage reference for adjusting said adjustable voltage signal; and
      a resistive element coupled between said potentiometer and ground.

10. The calibration system of claim 9, wherein said adjustable voltage reference comprises a variable Zener diode.

11. The calibration system of claim 9, further comprising a voltage drop device coupled between said primary voltage source and said adjustable voltage reference.

12. The calibration system of claim 11, wherein said voltage drop device includes at least one diode.

13. The calibration system of claim 9, wherein each of the plurality of excitation sources includes a precision resistor.

14. The calibration system of claim 13, wherein each of the plurality of excitation sources applies said adjustable voltage signal across said precision resistor to develop a current source signal.

15. The calibration system of claim 13, wherein each said precision resistor is part of the same pack chip for all of the excitation sources.

16. An excitation system for an instrumentation system for providing a plurality of excitation signals, comprising:
   an adjustable voltage source having a variable input for providing a reference voltage signal within a predetermined range, said adjustable voltage source comprising:
      a primary voltage source;
      a variable Zener diode coupled to said adjustable voltage source having a predetermined nominal voltage and an adjust input; and
      a variable resistor coupled to said adjust input of said variable Zener diode for varying said reference voltage signal about said nominal voltage and within said predetermined range; and
   a plurality of excitation sources, each having an input for receiving said reference voltage signal and an output for providing a calibrated excitation signal corresponding to said reference voltage signal.

17. An excitation system for an instrumentation system for providing a plurality of excitation signals, comprising:

an adjustable voltage source having a variable input for providing a reference voltage signal within a predetermined range, wherein said adjustable voltage source comprises:

a primary voltage source;

an adjustable voltage device coupled to said primary voltage source having a predetermined nominal voltage and an adjust input; and a variable resistor coupled to said adjust input of said adjustable voltage device for varying said reference voltage signal about said nominal voltage and within said predetermined range;

a voltage drop device coupled between said primary voltage source and said adjustable voltage device, wherein said voltage drop device comprises at least one diode; and a plurality of excitation sources, each having an input for receiving said reference voltage signal and an output for providing a calibrated excitation signal corresponding to said reference voltage signal, wherein said voltage drop device comprises at least one diode.

18. An excitation system for an instrumentation system for providing a plurality of excitation signals, comprising:

an adjustable reference source having a variable input for providing an adjustable reference signal within a predetermined range; and a plurality of current sources, each having an input for receiving said adjustable reference signal and an output for providing a calibrated current signal corresponding to said adjustable reference signal, wherein each of said plurality of current sources comprises:

a precision resistor receiving one polarity of said reference voltage signal;

a transistor having a current path coupled to said precision resistor; and an amplifier having an input receiving the other polarity of said reference voltage signal and an output coupled to said transistor control terminal for providing said calibrated current signal corresponding to said reference voltage signal applied across said precision resistor.

19. The excitation system of claim 18, wherein said transistor is a field effect transistor.

* * * * *